United States Patent
Hauptmann et al.

(10) Patent No.: US 6,450,272 B2
(45) Date of Patent: Sep. 17, 2002

(54) ROCK DRILL

(75) Inventors: Udo Hauptmann, Landsberg/Lech; Josef Starkmann, Hurlach; Karl-Heinz Hofmann, Weil; Tim Pröls, Munich, all of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/778,438

(22) Filed: Feb. 7, 2001

(30) Foreign Application Priority Data

Feb. 16, 2000 (DE) .......................................... 100 06 936

(51) Int. Cl.⁷ .............................................. E21B 10/44
(52) U.S. Cl. ........................................ 175/394; 175/415
(58) Field of Search ................................. 175/394, 395, 175/414, 415, 427, 420.1, 296, 417, 419, 420; 408/223, 224, 225, 230

(56) References Cited

U.S. PATENT DOCUMENTS

| | | | | |
|---|---|---|---|---|
| 4,294,319 A | * | 10/1981 | Guergen ..................... | 175/389 |
| 4,679,971 A | * | 7/1987 | Maier .......................... | 408/145 |
| 4,889,200 A | * | 12/1989 | Moser ......................... | 175/394 |
| 5,265,688 A | * | 11/1993 | Rumpp et al. ............... | 175/394 |
| 5,482,124 A | * | 1/1996 | Haussmann et al. ......... | 175/415 |
| 5,836,410 A | * | 11/1998 | Kleine ......................... | 175/415 |
| 6,089,337 A | | 7/2000 | Kleine et al. | |
| 6,116,361 A | * | 9/2000 | Kleine et al. ................ | 175/415 |
| 6,129,162 A | * | 10/2000 | Hauptmann .................. | 175/394 |

FOREIGN PATENT DOCUMENTS

WO      9706338      2/1997

* cited by examiner

Primary Examiner—Robert E. Pezzuto
(74) Attorney, Agent, or Firm—Sidley Austin Brown & Wood, LLP

(57) ABSTRACT

A drill including a body having mortises (7), and a solid hard metal head (4) having a plurality of bits (3) and secured to the drill body over the end surface (5) of the head (4) and additionally secured to the drill body over portions of side surfaces (6) of the bits, which are located in a radially outer region of the head (4), with the side surfaces (6) extending into mortises and including first surfaces, which are associated with at least some of the bits (3) and are subjected to pressure acting in a rotational direction of the drill during operation of the drill.

10 Claims, 2 Drawing Sheets

ROCK DRILL

BACKGROUND OF THE INVENTION

1. Field of the Invention

The present invention relates to a drill for drilling in stone and, particularly, in concrete, and which is inserted in a mechanized hand-held tool and is subjected to rotational and percussion movements for cutting abrasive material.

2. Description of the Prior Art

The drills of the type described, because they are used for removal of abrasive material, require that the parts, which are inserted in the drill head, be made of hard metal. The insertable parts are fixedly secured in the drill head. Usually, the parts, which are formed as hard metal plates, are inserted in axially extending mortises formed in the drill head and are soldered to the drill head. Such a drill is disclosed, e.g., in German Publication DE 20 08 825. In the drill disclosed in DE 20 08 825, the bits smoothly pass into associated helix ridges of a helix used for removal of the drilled or cut material. To insure a more reliable securing of the hard metal plates in the drill head, according to European Publication EP 09 47 662 A1, the hard metal plates have additional prismatic projections which engage in corresponding recesses provided in the drill.

The drawback of such attachment of hard metal plates in axial mortises consists in that the hard metal plates easily break out upon a possible radial hooking of the places, in particular when the drill strikes a reinforcing metal. An encounter of the drill with reinforcing metal, because of a limited flexural strength of a hard metal plate due to its small thickness, results in generation of a localized tensile stresses in boundary surfaces of the mortises in which the portion of a respective plate engages. The localized tensile stresses of the boundary surfaces facilitate the breaking out of the hard metal plate. Also, the axially extending boundary surfaces are subjected to an excessive fatigue, which is caused by shear stresses resulting from the drill being subjected to axial percussions. A further drawback of the above-described attachment of hard metal plates consists in that the provision of mortises for receiving the hard metal plates reduces free space available for removal of the drilled-off material.

German Publication DE 43 39 245 discloses forming an entire drill head of a hard metal and securing the drill head to the drill body only over the end surface of the drill head which extends substantially perpendicular to the rotational axis of the drill. The solid hard metal head has a compact, substantially convex, polygonal shape with the lengths of its sides being substantially the same. Because of its shape, the solid hard metal head has a high inner stiffness and does not require provision of axially extending boundary surfaces which would facilitate breaking out of the bits. Rather, the boundary surface, which extends in the radial direction, is subjected to a compression pulsating load. However, the remaining superimposed torsional stresses can result in a torsional fatigue of the radial edge of the boundary layer. To prevent hooking in reinforcing metal, which leads to increased torsional stresses, usually, auxiliary cutting edges are provided between the main cutting edges and which are arranged exclusively on the radial edge of the head and are axially offset backward. The auxiliary cutting edges, due to their penetration resistance and mass inertia, prevent the main cutting edges from penetrating deeply into the reinforcing metal by temporarily lifting the drill from the reinforcing metal. The manufacturing and economical drawbacks of this drill result from a large volume of the solid hard metal head when the drill is designed for drilling large-diameter bores.

European publication EP 88 44 48 discloses a solid hard metal head with an "X"-shaped arrangement of four cutting edges, with the main cutting edges and the auxiliary cutting edges, which are formed as side cutting edges, being arranged, respectively, diametrically opposite each other and with respective main and auxiliary cutting edges forming an angle that deviates from 90°. The "X"-shaped, solid, hard metal head has essentially a rotationally symmetrical, crosswise, axially mirror symmetrical, prismatic shape. The base surface is provided with deep, concave, obtuse-angled notches which extend radially inward along one-third of the base surface parallel to the cutting edges over the longer surfaces. The notches serve for removal of the cut abrasive material. The side cutting edges trail the main cutting edges in the rotational direction, forming with the respective main cutting edges acute angles. As a result, a large recess on each of the short sides of the base surface is limited by the radial edge region and serves for removal of some of the cut abrasive material in front of the respective auxiliary or side cutting edge. Because in EP 88 44 48, the head is secured to the drill body only over its end surface, torsional stresses, which are generated upon hooking of the drill with the reinforcing metal, result in the torsional fatigue of the head end surface. Another drawback of this head consists in that because of an obtuse angle, in the rotational direction, between the auxiliary cutting edge and trailing the auxiliary cutting edge, the main cutting edge, a large rotational angle is needed in order to overcome the mass inertia. However, practically, it is impossible to form such an angle in low-speed, large-diameter drills.

German Publication DE 197 07115 discloses a drill with an even number, but more than two, of radial, arranged rotationally symmetrical, bits and having a prismatic, solid, hard metal head, with the bits not being formed as separates plates but forming an integral part of the head. The head is secured in corresponding grooves having axially extending surfaces and formed in the drill body. The head is secured to the drill body over the head end surface and along the surfaces of the grooves. The securing the head over its end surface and along the surfaces of corresponding mortises insures, even in large diameter drills, break-proof securing of the bits, and the danger of the bits breaking out is substantially reduced even if the drill encounters a reinforcing metal. However, the drawback of this drill consists in that providing axial mortises on opposite sides of each bit reduces free space for forming respective recesses necessary for removal of the drilled-off abrasive material.

Accordingly, an object of the present invention to provide a rock drill without the drawbacks of conventional prior art rock drill.

Another object of the present invention is to provide a rock drill with break-proof securing of the hard metal bits and which would provide a sufficiently large space for removal of the drilled or cut-off abrasive material, while insuring a high drilling efficiency.

SUMMARY OF THE INVENTION

This and other objects of the present invention are achieved by providing a rock drill in which the solid hard metal head is secured to the drill body over the end surface of the head and is additionally secured to the drill body over portions of the side surfaces associated with respective bits, located in a radially outer region of the head, extending substantially parallel to a rotational axis of the drill, and extending into mortises formed in the drill body, with the side surfaces including first surfaces, which are associated with at least some of the bits and are subjected to pressure acting in a rotational direction of the drill during operation of the drill.

According to the present invention, the solid hard metal head in addition to being secured to the end surface of the drill body, which lies perpendicular to the rotational axis, is secured to the drill body along a portion of the side surfaces of the bits which lie in the outer radial region of the drill head and extend, advantageously, parallel to the rotational axis. The side surfaces of at least some of the bits support the respective bits in the rotational direction, i.e., they are subjected to a certain pressure. As a result, a break-proof attachment of the solid hard metal head to the drill body is achieved even at high torsional loads applied to the drill.

Advantageously, other portions of the bit side surfaces, which are not used for securing the solid hard metal head to the drill body, form a free transition to a recess that serves for removal of the drilled-off abrasive material. The material discharge recess lies in front of a respective main bit, thereby direct removal of the cut-off material, i.e., without a substantial carrying of the removable material in the rotational direction, takes place.

In the drills with an even number of bits which, preferably, divided in main and auxiliary bits, and which are arranged rotationally symmetrically, it is, advantageously, the main bits that are supported in the rotational direction. Thus, the side surfaces of these bits, which face in the rotational direction, remain free. The recess, which is associated with a respective main bit and lies in front of the respective main bit in the rotational direction is limited, advantageously, by a free, facing in a direction opposite to the rotational, side surface of an auxiliary bit that lies in front of the respective main bit in the rotational direction. In this way, as large as possible recess is provided in front of the respective main bit. The adjacent side surfaces of the adjacent main and associated therewith, auxiliary bits, which take part in securing of the drill head to the drill body and inner ends of which angularly butt-join each other, form a smaller recess in front of, in the rotational direction, an auxiliary bit, but the size of which is sufficient for removal of smaller amount of material cut off by the auxiliary bit. In this way, even with a high drilling efficiency, removal of the cut-off or drilled-off material is insured.

In a drill with four bits, two main bits and two auxiliary bits, which arranged, respectively, diametrically opposite each other, angularly adjoining each other, side surfaces of the adjacent main and auxiliary bits, which extend parallel to the rotational axis, are used for an additional securing of the drill head to the drill body. The remaining side surfaces of the main and auxiliary bits, which are likewise angularly adjoin each other in pairs and extend parallel to the rotational axis, remain free. Thus, with a solid hard metal head having four, substantially radially extending bits, each two, arranged substantially diametrically opposite each other, respective side surfaces are used for securing the drill head with the drill body, with each two other, likewise arranged diametrically opposite each other, side surfaces, which remain free, forming the larger recesses for removing the abrasive cut-off material.

For drills having main and auxiliary bits, it is advantageous when an auxiliary bit is located, in the rotational direction of the drill, in front of the associated therewith, main drill as this permits to reduce a torsional load, in particular when the drill encounters a reinforcing metal. The reduction of the rotational angle, which has to be bridged to overcome the mass inertia and, thereby, the reduction of the penetration time at the given rotational speed permit to reduce penetration of the main bit into the reinforcing metal and, thereby, to reduce torsional stresses in the bit. A relative diminishing of the recess in front of the main bit, which is caused by locating the associated auxiliary bit in front of it, in the rotational direction, is compensated by a relative increase of the free-lying side surfaces of the auxiliary bits. Thereby, it is insured that the same amount of the drilled-off material can be removed, while a smaller penetration of the main bit into the reinforcing metal is achieved.

An advantageously vertical, not radial, arrangement of the free surfaces of an auxiliary bits trailing respective radially extending main bits increases the inner rigidity of the solid hard metal head and improves the removal of the drilled-off abrasive material by reducing the adjoining frictionally engageable side surfaces.

Advantageously, the cross-sectional surface of the drill head, which is necessary to provide for securing of the drill head to the drill body and to insure that the respective side surfaces extend into the mortises, smoothly passes into the drill body, with the outer radial regions of the drill head passing into the corresponding helix ridges, and with the main and auxiliary bits passing into the corresponding main and auxiliary helix ridges. Thereby, transmission of forces into the drill body and removal of the drilled-off material is insured. The foregoing structure also insures that the separate recesses for the respective main and auxiliary bits and combined in a common large helix ridge with small frictionally engageable surfaces.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
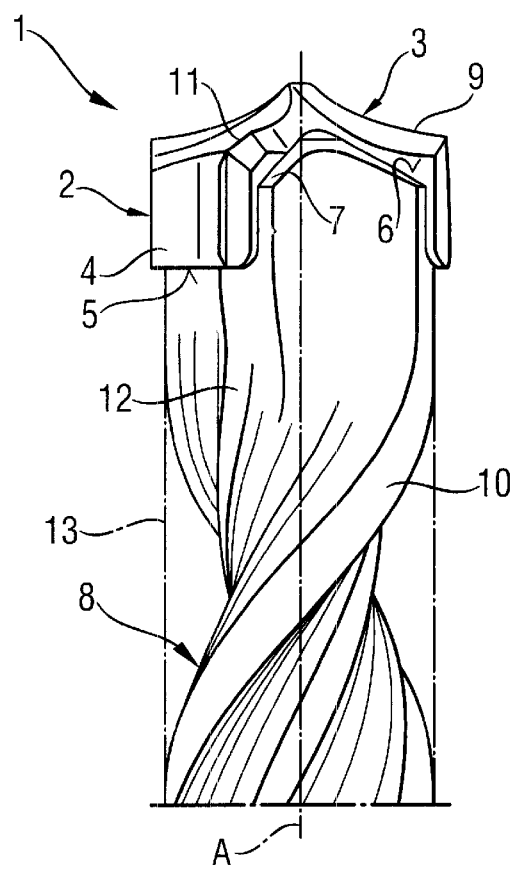
FIG. 1 a side view of a front portion of a rock drill according to the present invention.
Figure 2:
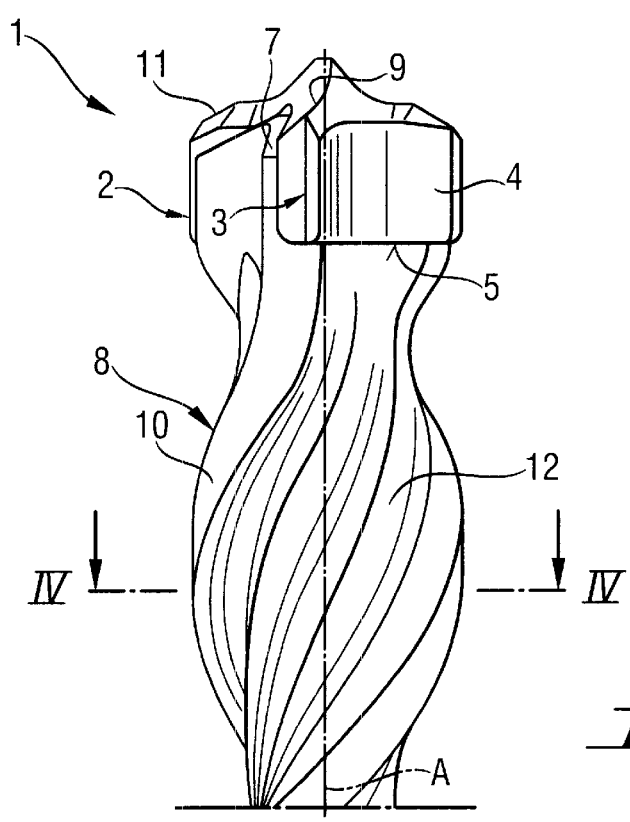
FIG. 2 a side view of a front portion of the rock drill show in FIG. 1 but turned 90° with respect to the view shown in FIG. 1.

A rock drill 1 according tot he present invention, which is shown in FIGS. 1–2, has a drill head 2 which is provided with hard metal bits 3 and is formed integrally with the bits 3 as a hard metal head 4. The solid hard metal head 4 has an end surface 5 along which it is secured to the drill body. The hard metal head 4 is also secured to the drill body along side surfaces 6 of the bits 3, which extend parallel to the rotational axis A, in the mortises 7. The hard metal head 4 is secured to the drill body by friction welding or by brazing. A helix 8, which is twisted about the rotation axis A adjoins the drill head, with the cross-section of the drill head 2 passing substantially smoothly into the helix 8. A main bit 9 substantially smoothly passes into a main helix ridge 10, and auxiliary bit 11 substantially smoothly passes into auxiliary helix ridge 12. The auxiliary helix ridge 12 does not reach the generating curve 13 of the rotatable main helix ridge 10.

Figure 3:
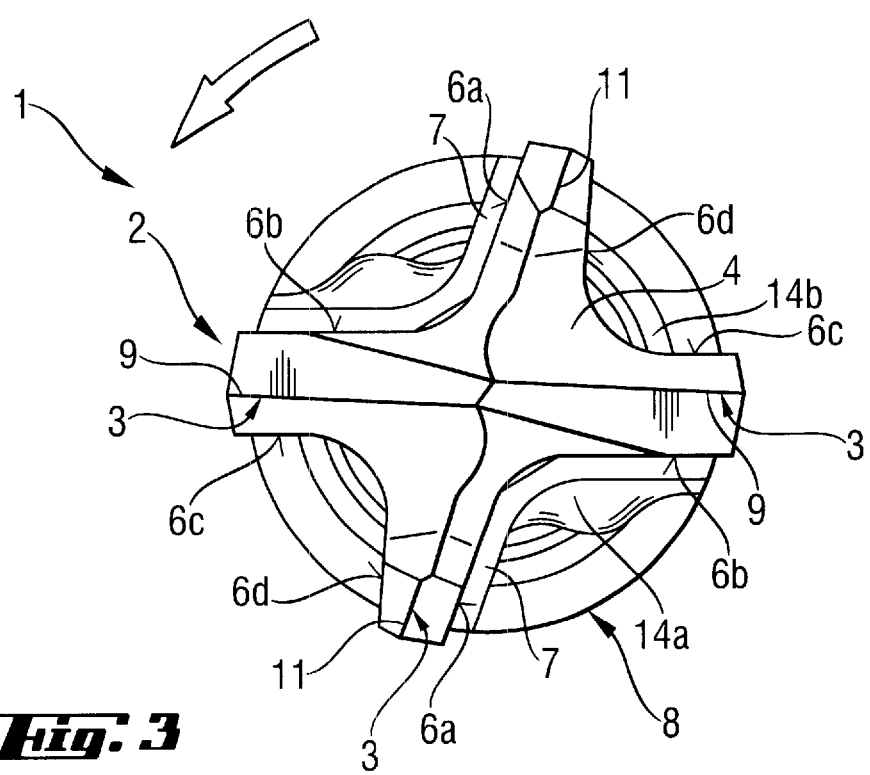
FIG. 3 a front view of the front portion of the rock drill shown in FIGS. 1–2.

As shown in FIG. 3, the drilling head 2 has four paired, rotationally symmetrical bits 3. A recess 14a, 14b is provided between each two adjacent bits 3 for removing the cut abrasive material. The bits 3 are formed as circumferentially alternatingly arranged main bits 9 and auxiliary bits 11. The side surfaces 6a of the auxiliary bits 11 face in the rotational direction, and the side surfaces 6b of the main bits 9 face in the direction opposite to the rotational direction. The side surfaces 6a, 6b of the respective adjacent bits 3, alternating main and auxiliary bits 9 and 11, are arranged adjacent to each other and are secured in the angularly shaped mortises 7 angularly and contiguously with respect to each other. The diametrically opposite angular mortises 7 form each a small recess 14a. A free-lying side surface 6c of the main bit 9 facing in the rotational direction and a free-lying side surface 6d of the auxiliary bit 11 facing in the direction opposite to the rotational direction, which are arranged adjacent to each other and arranged angularly and contiguously with respect to each other, form together a large recess 14b. Each of the auxiliary bits 11 forms an acute angle with a trailing it in rotational direction, main bit 9, with the free-lying side surface 6d of the auxiliary bit 11 being arranged substantially perpendicular to the trailing it main bit 3.

Figure 4:
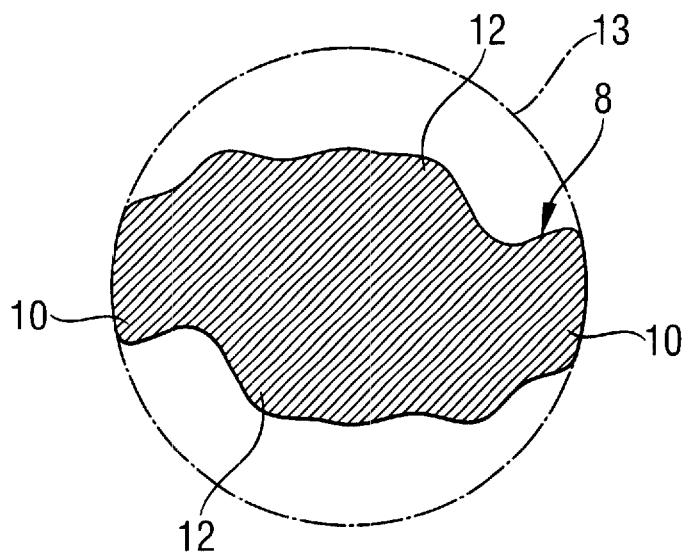
FIG. 4 a cross-sectional view along line IV—IV in FIG. 2.

FIG. 4 shows a cross-section of the helix 8 and main and auxiliary helix ridges 10 and 12. As can be seen in FIG. 4, the auxiliary helix ridge 12 does not reach the generating envelope 13.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A drill, comprising a body having mortise means (7); and a solid hard metal head (4) having an end surface (5) and a plurality of bits formed integrally with the head (4), located in a radially outer region of the head (4) and having each a side surface (6) extending substantially parallel to a rotational axis (A) of the drill, the solid hard metal head (4) being secured to the drill body along the end surface (5) thereof and, additionally, over the side surfaces (6) partially extending into mortise means (7), with the side surfaces (6) including first surfaces (6a, 6b), which are associated with at least some of the bits (3) and are subjected to pressure acting in a rotational direction of the drill during operation of the drill.

2. A drill according to claim 1, wherein the side surfaces (6) include second surfaces (6c, 6d) formed as free-lying surfaces.

3. A drill according to claim 2, wherein the second surfaces (6c), which are associated with at least some of the bits (3), face in the rotational direction of the drill.

4. A drill according to claim 2, wherein the plurality of bits (3) consists of even number of bits formed as main bits (9) and auxiliary bits (11), wherein the first side surfaces includes surfaces (6a, 6b) associated with the main and auxiliary bits (9, 11), respectively, and wherein the surfaces (6a, 6b) associated with adjacent main and auxiliary bits are contiguous.

5. A drill according to claim 4, wherein the portion of the side surfaces, which extend into the mortise means (7) and along which the solid hard metal head (4) is secured to the drill body, is a portion of the first surfaces (6a, 6b), and wherein second surfaces (6c, 6d), which are associated with the adjacent main and auxiliary bits (9, 11) are contiguous and form together a recess (14b) associated with the main bit (9) and located in front of the main bit (9) in the rotational direction of the drill.

6. A drill according to claim 4, wherein the even number of bits (3) consists of four substantially radially extending bits (3), two main bits (9) arranged substantially diametrically opposite each other, and two auxiliary bits (11) likewise arranged substantially diametrically opposite each other.

7. A drill according to claim 4, wherein the auxiliary bits (11) are arranged, in the rotational direction of the drill, in front of respective, associated therewith, main bits (9).

8. A drill according to claim 7, wherein a respective auxiliary bit (11), which trails, in the rotational direction of the drill, a respective main bit (9), is arranged vertically with respect to the respective main bit.

9. A drill according to claim 4, wherein a cross-sectional surface of the drill head (2) smoothly passes into the drill body, and radially outer regions of the head (2) pass into respective helix ridges (10, 12) of a helix forming the drill body.

10. A drill according to claim 9, wherein the helix ridges comprises main helix ridges (10) and auxiliary helix ridges (12); wherein the main bits (9) pass into the main helix ridges (10), and the auxiliary bits (11) pass into the auxiliary helix region (12), and wherein a radial extent of the auxiliary helix ridges (12) continuously radially diminishes so that the auxiliary helix ridges (12) do not reach a generating envelope (13) of the main helix ridges.

* * * * *